United States Patent
Bodwin et al.

(10) Patent No.: US 9,183,236 B2
(45) Date of Patent: *Nov. 10, 2015

(54) LOW LEVEL OBJECT VERSION TRACKING USING NON-VOLATILE MEMORY WRITE GENERATIONS

(71) Applicant: SanDisk Enterprise IP LLC, Milpitas, CA (US)

(72) Inventors: James M. Bodwin, Cupertino, CA (US); Darpan Dinker, Fremont, CA (US); Andrew D. Eckhardt, Sunnyvale, CA (US); Darryl Ouye, Aptos, CA (US)

(73) Assignee: SANDISK ENTERPRISE IP LLC, Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/263,945

(22) Filed: Apr. 28, 2014

(65) Prior Publication Data

US 2014/0236911 A1    Aug. 21, 2014

Related U.S. Application Data

(63) Continuation of application No. 13/084,464, filed on Apr. 11, 2011, now Pat. No. 8,874,515.

(51) Int. Cl.
*G06F 17/30* (2006.01)

(52) U.S. Cl.
CPC ...... *G06F 17/30309* (2013.01); *G06F 17/3023* (2013.01)

(58) Field of Classification Search
CPC .................. G06F 17/3023; G06F 17/30309
See application file for complete search history.

(56) References Cited

U.S. PATENT DOCUMENTS

| | | |
|---|---|---|
| 4,916,605 A | 4/1990 | Beardsley et al. |
| 5,046,002 A | 9/1991 | Takashi et al. |
| 5,057,996 A | 10/1991 | Cutler et al. |
| 5,117,350 A | 5/1992 | Parrish et al. |
| 5,212,789 A | 5/1993 | Rago |
| 5,287,496 A | 2/1994 | Chen et al. |
| 5,297,258 A | 3/1994 | Hale et al. |

(Continued)

FOREIGN PATENT DOCUMENTS

| | | |
|---|---|---|
| EP | 1548600 B1 | 1/2007 |
| EP | 1746510 A1 | 1/2007 |

OTHER PUBLICATIONS

Unknown Author, Supermicro, "Intel Itanium Processor 9300 Series Based Server Systems", Jul. 8, 2010, http://www.supermicro.com/products/info/itanium.cfm, 3 pages.

(Continued)

*Primary Examiner* — William Spieler
(74) *Attorney, Agent, or Firm* — Morgan, Lewis & Bockius LLP

(57) ABSTRACT

A method for retrieving versioned data in a non-volatile memory is provided. The method includes: (1) receiving a read request for a data object, (2) in response to the request, determining, via an object table, whether one or more versions of the data object exist in memory, (3) in accordance with a determination that one or more versions exist in memory, obtaining, via the object table, a respective location where each of the one or more versions of the data object are stored, and (4) reading at least one of the one or more versions of the data object from the respective location into volatile memory.

18 Claims, 6 Drawing Sheets

(56) References Cited

U.S. PATENT DOCUMENTS

| | | |
|---|---|---|
| 5,394,555 A | 2/1995 | Hunter et al. |
| 5,403,639 A | 4/1995 | Belsan et al. |
| 5,423,037 A | 6/1995 | Hvasshovd |
| 5,509,134 A | 4/1996 | Fandrich et al. |
| 5,537,534 A | 7/1996 | Voigt et al. |
| 5,603,001 A | 2/1997 | Sukegawa et al. |
| 5,611,057 A | 3/1997 | Pecone et al. |
| 5,613,071 A | 3/1997 | Rankin et al. |
| 5,680,579 A | 10/1997 | Young et al. |
| 5,692,149 A | 11/1997 | Lee |
| 5,701,480 A | 12/1997 | Raz |
| 5,742,787 A | 4/1998 | Talreja |
| 5,887,138 A | 3/1999 | Hagersten et al. |
| 5,897,661 A | 4/1999 | Baranovsky et al. |
| 5,897,664 A | 4/1999 | Nesheim et al. |
| 5,960,436 A | 9/1999 | Chang et al. |
| 5,963,983 A | 10/1999 | Sakakura et al. |
| 6,000,006 A | 12/1999 | Bruce et al. |
| 6,023,745 A | 2/2000 | Lu |
| 6,052,815 A | 4/2000 | Zook |
| 6,130,759 A | 10/2000 | Blair |
| 6,141,692 A | 10/2000 | Loewenstein et al. |
| 6,151,688 A | 11/2000 | Wipfel et al. |
| 6,216,126 B1 | 4/2001 | Ronström |
| 6,298,390 B1 | 10/2001 | Matena et al. |
| 6,308,169 B1 | 10/2001 | Ronström et al. |
| 6,434,144 B1 | 8/2002 | Romanov |
| 6,467,060 B1 | 10/2002 | Malakapalli et al. |
| 6,615,313 B2 | 9/2003 | Kato et al. |
| 6,658,526 B2 | 12/2003 | Nguyen et al. |
| 6,704,835 B1 | 3/2004 | Garner |
| 6,728,826 B2 | 4/2004 | Kaki et al. |
| 6,745,209 B2 | 6/2004 | Holenstein et al. |
| 6,804,766 B1 | 10/2004 | Noel et al. |
| 6,874,044 B1 | 3/2005 | Chou et al. |
| 6,938,084 B2 | 8/2005 | Gamache et al. |
| 6,944,699 B1 | 9/2005 | Bugnion et al. |
| 6,981,070 B1 | 12/2005 | Luk et al. |
| 7,003,586 B1 | 2/2006 | Bailey et al. |
| 7,010,521 B2 | 3/2006 | Hinshaw et al. |
| 7,043,621 B2 | 5/2006 | Merchant et al. |
| 7,082,481 B2 | 7/2006 | Lambrache et al. |
| 7,162,467 B2 | 1/2007 | Eshleman et al. |
| 7,200,718 B2 | 4/2007 | Duzett |
| 7,203,890 B1 | 4/2007 | Normoyle |
| 7,249,280 B2 | 7/2007 | Lamport et al. |
| 7,251,749 B1 | 7/2007 | Fong et al. |
| 7,269,708 B2 | 9/2007 | Ware |
| 7,269,755 B2 | 9/2007 | Moshayedi et al. |
| 7,272,605 B1 | 9/2007 | Hinshaw et al. |
| 7,272,654 B1 | 9/2007 | Brendel |
| 7,281,160 B2 | 10/2007 | Stewart |
| 7,305,386 B2 | 12/2007 | Hinshaw et al. |
| 7,334,154 B2 | 2/2008 | Lorch et al. |
| 7,359,927 B1 | 4/2008 | Cardente |
| 7,383,290 B2 | 6/2008 | Mehra et al. |
| 7,406,487 B1 | 7/2008 | Gupta et al. |
| 7,415,488 B1 | 8/2008 | Muth et al. |
| 7,417,992 B2 | 8/2008 | Krishnan |
| 7,436,771 B2 | 10/2008 | Roberts et al. |
| 7,467,265 B1 | 12/2008 | Tawri et al. |
| 7,529,882 B2 | 5/2009 | Wong |
| 7,542,968 B2 | 6/2009 | Yokomizo et al. |
| 7,562,162 B2 | 7/2009 | Kreiner et al. |
| 7,584,222 B1 | 9/2009 | Georgiev |
| 7,610,445 B1 | 10/2009 | Manus et al. |
| 7,623,494 B2 | 11/2009 | Zhu et al. |
| 7,627,618 B2 | 12/2009 | Honigfort |
| 7,647,449 B1 | 1/2010 | Roy et al. |
| 7,657,710 B2 | 2/2010 | Loewenstein |
| 7,809,691 B1 | 10/2010 | Karmarkar et al. |
| 7,822,711 B1 | 10/2010 | Ranade |
| 7,885,923 B1 | 2/2011 | Tawri et al. |
| 7,917,472 B2 | 3/2011 | Persson |
| 8,015,352 B2 | 9/2011 | Zhang et al. |
| 8,018,729 B2 | 9/2011 | Skinner |
| 8,024,515 B2 | 9/2011 | Auerbach et al. |
| 8,037,349 B2 | 10/2011 | Mandagere et al. |
| 8,069,328 B2 | 11/2011 | Pyeon |
| 8,099,391 B1 | 1/2012 | Monckton |
| 8,103,643 B2 | 1/2012 | Danilov et al. |
| 8,161,248 B2 | 4/2012 | Blumrich et al. |
| 8,205,206 B2 | 6/2012 | Ozer et al. |
| 8,225,053 B1 | 7/2012 | McCorkendale et al. |
| 8,239,617 B1 | 8/2012 | Linnell |
| 8,261,266 B2 | 9/2012 | Pike et al. |
| 8,261,289 B2 | 9/2012 | Kasravi et al. |
| 8,321,450 B2 | 11/2012 | Thatte et al. |
| 8,335,776 B2 | 12/2012 | Gokhale |
| 8,356,306 B2 | 1/2013 | Herington |
| 8,370,853 B2 | 2/2013 | Giampaolo et al. |
| 8,401,994 B2 | 3/2013 | Hoang et al. |
| 8,504,526 B2 | 8/2013 | Gokhale et al. |
| 8,666,939 B2 | 3/2014 | O'Krafka et al. |
| 8,671,074 B2 | 3/2014 | Wang et al. |
| 8,683,480 B2 | 3/2014 | Bachar et al. |
| 2001/0032253 A1 | 10/2001 | Duxbury |
| 2002/0089933 A1 | 7/2002 | Giroux et al. |
| 2002/0129192 A1 | 9/2002 | Spiegel et al. |
| 2002/0166031 A1 | 11/2002 | Chen et al. |
| 2002/0184239 A1 | 12/2002 | Mosher, Jr. et al. |
| 2003/0016596 A1 | 1/2003 | Chiquoine et al. |
| 2003/0097610 A1 | 5/2003 | Hofner |
| 2003/0177408 A1 | 9/2003 | Fields et al. |
| 2003/0220985 A1 | 11/2003 | Kawamoto et al. |
| 2004/0010502 A1 | 1/2004 | Bomfim et al. |
| 2004/0078379 A1 | 4/2004 | Hinshaw et al. |
| 2004/0143562 A1 | 7/2004 | Chen et al. |
| 2004/0148283 A1 | 7/2004 | Harris et al. |
| 2004/0172494 A1 | 9/2004 | Pettey et al. |
| 2004/0172577 A1 | 9/2004 | Tan et al. |
| 2004/0205151 A1 | 10/2004 | Sprigg et al. |
| 2004/0230862 A1 | 11/2004 | Merchant et al. |
| 2004/0267835 A1 | 12/2004 | Zwilling et al. |
| 2005/0005074 A1 | 1/2005 | Landin et al. |
| 2005/0021565 A1 | 1/2005 | Kapoor et al. |
| 2005/0027701 A1 | 2/2005 | Zane et al. |
| 2005/0028134 A1 | 2/2005 | Zane et al. |
| 2005/0034048 A1 | 2/2005 | Nemawarkar et al. |
| 2005/0081091 A1 | 4/2005 | Bartfai et al. |
| 2005/0086413 A1 | 4/2005 | Lee et al. |
| 2005/0120133 A1 | 6/2005 | Slack-Smith |
| 2005/0131964 A1 | 6/2005 | Saxena |
| 2005/0240635 A1 | 10/2005 | Kapoor et al. |
| 2005/0246487 A1 | 11/2005 | Ergan et al. |
| 2006/0059428 A1 | 3/2006 | Humphries et al. |
| 2006/0064549 A1 | 3/2006 | Wintergerst |
| 2006/0085594 A1 | 4/2006 | Roberson et al. |
| 2006/0123200 A1 | 6/2006 | Ito et al. |
| 2006/0130063 A1 | 6/2006 | Kilian et al. |
| 2006/0161530 A1 | 7/2006 | Biswal et al. |
| 2006/0174063 A1 | 8/2006 | Soules et al. |
| 2006/0174069 A1 | 8/2006 | Shaw et al. |
| 2006/0179083 A1 | 8/2006 | Kulkarni et al. |
| 2006/0195648 A1 | 8/2006 | Chandrasekaran et al. |
| 2006/0212795 A1 | 9/2006 | Cottrille et al. |
| 2006/0218210 A1 | 9/2006 | Sarma et al. |
| 2006/0242163 A1 | 10/2006 | Miller et al. |
| 2006/0253724 A1 | 11/2006 | Zhang |
| 2007/0038794 A1 | 2/2007 | Purcell et al. |
| 2007/0043790 A1 | 2/2007 | Kryger |
| 2007/0043860 A1 | 2/2007 | Pabari |
| 2007/0073896 A1 | 3/2007 | Rothman et al. |
| 2007/0143368 A1 | 6/2007 | Lundsgaard et al. |
| 2007/0156842 A1 | 7/2007 | Vermeulen et al. |
| 2007/0174541 A1 | 7/2007 | Chandrasekaran et al. |
| 2007/0234182 A1 | 10/2007 | Wickeraad et al. |
| 2007/0276784 A1 | 11/2007 | Piedmonte |
| 2007/0283079 A1 | 12/2007 | Iwamura et al. |
| 2007/0288692 A1 | 12/2007 | Bruce et al. |
| 2007/0288792 A1 | 12/2007 | Thorpe et al. |
| 2007/0294564 A1 | 12/2007 | Reddin et al. |
| 2007/0299816 A1 | 12/2007 | Arora et al. |
| 2008/0016300 A1 | 1/2008 | Yim et al. |

(56) References Cited

U.S. PATENT DOCUMENTS

| | | |
|---|---|---|
| 2008/0034076 A1 | 2/2008 | Ishikawa et al. |
| 2008/0034174 A1 | 2/2008 | Traister et al. |
| 2008/0034249 A1 | 2/2008 | Husain et al. |
| 2008/0046538 A1 | 2/2008 | Susarla et al. |
| 2008/0046638 A1 | 2/2008 | Maheshwari et al. |
| 2008/0104141 A1* | 5/2008 | McMahon ............... 707/203 |
| 2008/0126706 A1 | 5/2008 | Newport et al. |
| 2008/0172402 A1 | 7/2008 | Birdwell et al. |
| 2008/0256103 A1 | 10/2008 | Fachan et al. |
| 2008/0288713 A1 | 11/2008 | Lee et al. |
| 2008/0288819 A1 | 11/2008 | Heller, Jr. |
| 2008/0295105 A1 | 11/2008 | Ozer et al. |
| 2008/0301256 A1 | 12/2008 | McWilliams |
| 2009/0006500 A1 | 1/2009 | Shiozawa et al. |
| 2009/0006681 A1 | 1/2009 | Hubert et al. |
| 2009/0006888 A1 | 1/2009 | Bernhard et al. |
| 2009/0019456 A1 | 1/2009 | Saxena et al. |
| 2009/0024871 A1 | 1/2009 | Emaru et al. |
| 2009/0030943 A1 | 1/2009 | Kall |
| 2009/0059539 A1 | 3/2009 | Ryu et al. |
| 2009/0070530 A1 | 3/2009 | Satoyama et al. |
| 2009/0150599 A1 | 6/2009 | Bennett |
| 2009/0177666 A1 | 7/2009 | Kaneda |
| 2009/0198791 A1 | 8/2009 | Menghnani |
| 2009/0240664 A1 | 9/2009 | Dinker et al. |
| 2009/0240869 A1 | 9/2009 | O'Krafka et al. |
| 2009/0327751 A1 | 12/2009 | Koifman et al. |
| 2010/0058021 A1 | 3/2010 | Kawamura |
| 2010/0080057 A1 | 4/2010 | Reuter et al. |
| 2010/0107017 A1 | 4/2010 | Munjal et al. |
| 2010/0125695 A1 | 5/2010 | Wu et al. |
| 2010/0241895 A1 | 9/2010 | Li et al. |
| 2010/0262762 A1 | 10/2010 | Borchers et al. |
| 2010/0299490 A1 | 11/2010 | Attarde et al. |
| 2010/0306448 A1 | 12/2010 | Chen et al. |
| 2010/0318821 A1 | 12/2010 | Kwan et al. |
| 2010/0325498 A1 | 12/2010 | Nagadomi |
| 2011/0022566 A1 | 1/2011 | Beaverson et al. |
| 2011/0072206 A1 | 3/2011 | Ross et al. |
| 2011/0082965 A1 | 4/2011 | Koka et al. |
| 2011/0082985 A1 | 4/2011 | Haines et al. |
| 2011/0099420 A1 | 4/2011 | Macdonald et al. |
| 2011/0167038 A1 | 7/2011 | Wang et al. |
| 2011/0179279 A1 | 7/2011 | Greevenbosch et al. |
| 2011/0185147 A1 | 7/2011 | Hatfield et al. |
| 2011/0191299 A1 | 8/2011 | Huu et al. |
| 2011/0225214 A1 | 9/2011 | Guo |
| 2012/0005154 A1 | 1/2012 | George et al. |
| 2012/0072449 A1* | 3/2012 | Patch et al. ............... 707/770 |
| 2013/0066948 A1 | 3/2013 | Colrain et al. |
| 2013/0198478 A1 | 8/2013 | Bitner |

OTHER PUBLICATIONS

Ajmani, Automatic Software Upgrades for Distributed Systems, MIT, Sep. 2004, 164 pgs.
Amza, Data Replication Strategies for Fault Tolerance and Availability on Commodity Clusters, 2000, 9 pgs.
bsn-modulestore, Versioning Concept, Oct. 13, 2010, 2 pgs.
Btrfs, wikipedia, Oct. 3, 2011, 9 pgs.
Buchholz, The Structure of the Reiser File System, Jan. 26, 2006, 21 pgs.
Chacon, Git, The Fast Version Control System, Oct. 30, 2011, 3 pgs.
Chockler, Active Disk Paxos with infinitely many processes, Springer-Verlag, Apr. 2005, 12 pgs.
Dwork, Concensus in the presence of partial synchrony, MIT, 1988, 6 pgs.
Email Communication from James Bodwin to Christopher Brokaw re prior art, Sep. 13, 2011, 4 pgs.
Git (Software), wikipedia, Oct. 3, 2011, 3 pgs.
Guerraoui, A Leader Election Protocol for Eventually Synchronous Shared Memory Systems, IEEE, 2006, 6 pgs.
Hitz, File System Design for an NFS File Server Appliance, Jan. 19, 1994, 23 pgs.
Lamport, Cheap Paxos, Microsoft, 2004, 9 pgs.
Lamport, Fast Paxos, Microsoft, Jul. 2005, 43 pgs.
Lamport, Generalized Consensus and Paxos, Microsoft, Mar. 2004, 25 pgs.
Lamport, Paxos Made Simple, Nov. 2001, 14 pgs.
Malkhi, Lecture notes in computer science [Section: Omega Meets Paxos, Leader election and stability without eventual timely links], 2005, pp. 199-213.
McDonald, Architectural Semantics for Practical Transactional Memory, Jun. 2006, 12 pgs.
McGonigle, A Short History of btrfs, Aug. 14, 2009, 11 pgs.
Mellor, ZFS—the future of file systems?, Aug. 14, 2006, 5 pgs.
Mercurial, wikipedia, Oct. 2, 2011, 6 pgs.
Module: Mongoid::Versioning, 2011, 6 pgs.
Mukherjee et al., Verification of an Industrial CC-NUMA server, Proceedings of ASP-DAC 2002, 7th Asia and South Pacifric and the 15th International Conference on VLSI Design, Jan. 7-11, 2002, 6 pages.
Noach, Database Schema Under Version Control, 2011, 6 pgs.
Pease, Reaching Agreement in the Presence of Faults, ACM, 1980, pp. 228-234.
Reiser FS, wikipedia, Sep. 17, 2011, 5 pgs.
Rice, Extension Versioning, Update and Compatibility, Aug. 9, 2011, 11 pgs.
Rice, Toolkit Version Format, Aug. 19, 2011, 4 pgs.
Russell, Track and Record Database Schema Versions, Jun. 28, 2005, 8 pgs.
Schneider, Implementing fault tolerant services using the state machine, Cornell Univ., 1990, 21 pgs.
Schooner Information Technology, IPAF, PCT/US2008/065167, Oct. 23, 2008, 7 pgs.
Schooner Information Technology, ISR/WO, PCT/US2008/065167, Jan. 28, 2009, 15 pgs.
Shacham et al., Verificaiton of chip multiprocessor memory systems using a relaxed scoreboard, Microarchitecture, 2008, MICRO-41, 2008, 41st IEEE/ACM International Symposium, Nov. 8-12, 2008, 12 pages.
SQL Server Database Schema Versioning and Update, Dec. 2, 2009, 2 pgs.
Sufficiently Advanced Bug, File Versioning, Caching and Hashing, Oct. 3, 2011, 3 pgs.
The Z File System (ZFS), Free BSD Hanbook, Oct. 3, 2011, 8 pgs.
Tux3 Linux Filesystem Project, 2008, 1 pg.
Tux3 Versioning Filesystem, Jul. 2008, 67 pgs.
Tux3, wikipedia, Jun. 2, 2010, 3 pgs.
Vijaykumar, Speculative Versioning Cache, Dec. 1, 2001, 13 pgs.
WAFL—Write Anywhere File Layout, 1999, 1 pg.
Walker, Hash Table Tutorial, Oct. 13, 2007, 14 pgs.
Write Anywhere File Layout, wikipedia, Sep. 9, 2011, 2 pgs.
ZFS, wikipedia, Sep. 30, 2011, 18 pgs.

* cited by examiner

LOW LEVEL OBJECT VERSION TRACKING USING NON-VOLATILE MEMORY WRITE GENERATIONS

RELATED APPLICATION DATA

The present application is a continuation of U.S. patent application Ser. No. 13/084,464, filed Apr. 11, 2011, which is incorporated herein by reference in its entirety.

The present application is related to U.S. patent application Ser. No. 12/276,540, filed on Nov. 24, 2008, now U.S. Pat. No. 8,229,945, which is incorporated herein by reference in its entirety.

FIELD OF THE INVENTION

The disclosure herein relates to object version tracking using non-volatile memory write generations.

BACKGROUND

The term versioning is applied to the creation and management of multiple releases of an object such as a document, where all releases have the same general features but are improved, upgraded or customized. Commonly, the term is used for digital documents such as application source codes, operating systems, software packages, and management of data, art resources such as blueprints or electronic models, and other projects.

Data versioning is performed for a number of purposes including increased concurrency for applications requiring concurrency control, providing snapshot isolation for consistent data reads, and for the creation of backup snapshots to help recovery from hardware and software errors. Versioning involves retaining pre-update data values after data have been updated. For example, in case an error occurs and the results of a calculation are incorrect, restoring the pre-update data values could be very helpful. Versioning can be done incrementally on every update of each document (i.e., transactional versioning) or done globally at certain times (i.e., check-pointing with snapshots).

Using version control, one can keep track of different versions of electronic information, for example, in collaborative data sharing and editing among users of systems that employ different versions of a document. Version control systems are typically stand-alone applications. With the spread of use of non-volatile memories such as flash memories, there is a need for techniques that enable transactional versioning at the data element level, versioning for global snapshots, and other methods of version control in flash memories.

BRIEF DESCRIPTION OF THE DRAWINGS

Embodiments of the present embodiments are described herein by way of example, and not by way of limitation, in the figures of the accompanying drawings and in which like reference numerals refer to similar elements, as follows.

DETAILED DESCRIPTION

Approaches for data versioning in a non-volatile memory are disclosed. In the following description, numerous specific details are set forth such as examples of specific components, circuits, and processes to provide a thorough understanding of the present disclosure. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known components are shown in block diagram form to avoid obscuring the present disclosure.

A method in accordance with present embodiments includes creating an object key associated with a data object. An index into an object table is generated using the object key. A version number is stored in conjunction with the data object stored in non-volatile memory. The object key and the location information of the data object in the non-volatile memory are stored in an object linked-list. A record associated with the data object is created in an object table. The record includes an index, a reference to the object linked-list, and the version number. The index is generated based on the object key.

Embodiments described provide approaches for data versioning, which uses flash memory controller write operations to create new data versions. Previous data versions are tracked using lists stored in non-volatile memory, such as in flash memory or another non-volatile memory. Approaches for obtaining correct versions and for recovering storage from unreferenced versions are presented.

Figure 1:
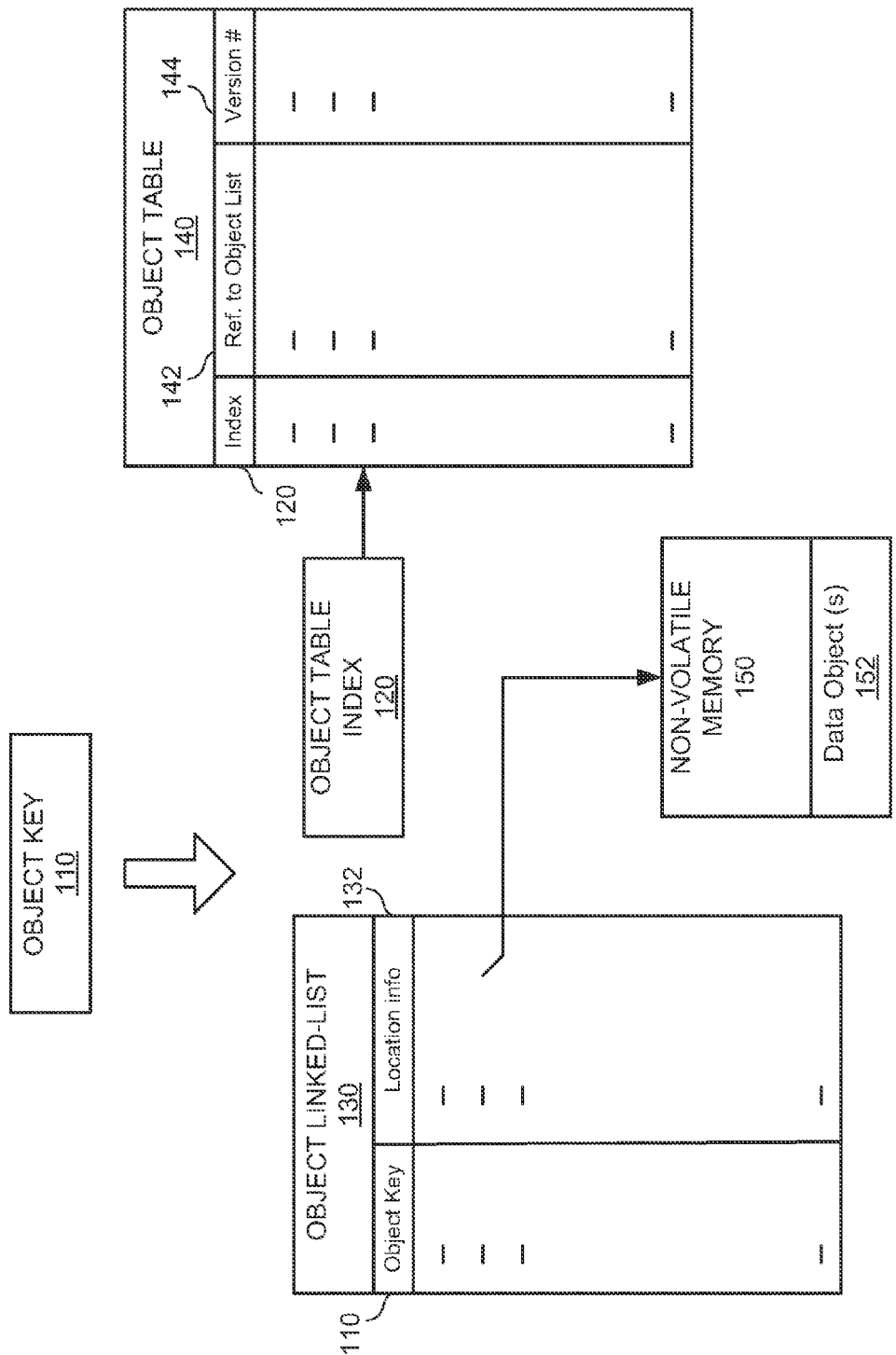
FIG. 1 is a diagram illustrating a high level implementation of data versioning in non-volatile memory in accordance with some embodiments.

FIG. 1 is a diagram illustrating a high level implementation of data versioning in non-volatile memory in accordance with some embodiments. A non-volatile memory 150, such as flash memory, may contain various versions of data objects 152, such as documents (e.g., text documents, images, audio or video files, messages, software codes, and the like). When a read or write request for a data object 152 is received, a determination is made as to whether any previous version of the data object 152 exists in the non-volatile memory 150. If one or more versions of data object 152 exist, then a determination is made as to what location in non-volatile memory 150 the one or more objects are stored. These determinations may be made using object table 140 in an embodiment.

In an embodiment, object table 140 may include multiple records each including an object table index 120, a reference 142 to an object linked-list, and a version number 144. Object table index 120 is generated based on an object key 110, which uniquely identifies data object 152. First, object key 110 is hashed, using well know algorithms, to produce a syndrome (e.g., a 32 bit syndrome). Then, a portion of the syndrome is masked to produce object table index 120, which is an index into the object table 140. The reference 142 to the object linked-list in object table 140 points to a linked object-list 130, which includes entries such as object key 110 and location information 132. Location information 132 includes a flash location or a list of flash locations depending on the data object identified by object key 110 (i.e., data object 152) being a single-page object or a multiple-page object (multipage objects occupy more than one flash-pages and use full pages except for the last page).

Once the location of data object 152 has been determined the appropriate PCI-Express commands are issued to read the corresponding flash page (or portion of a flash page) into flash card-based non-volatile (NV) DRAM and from there to CPU memory.

Figure 2:
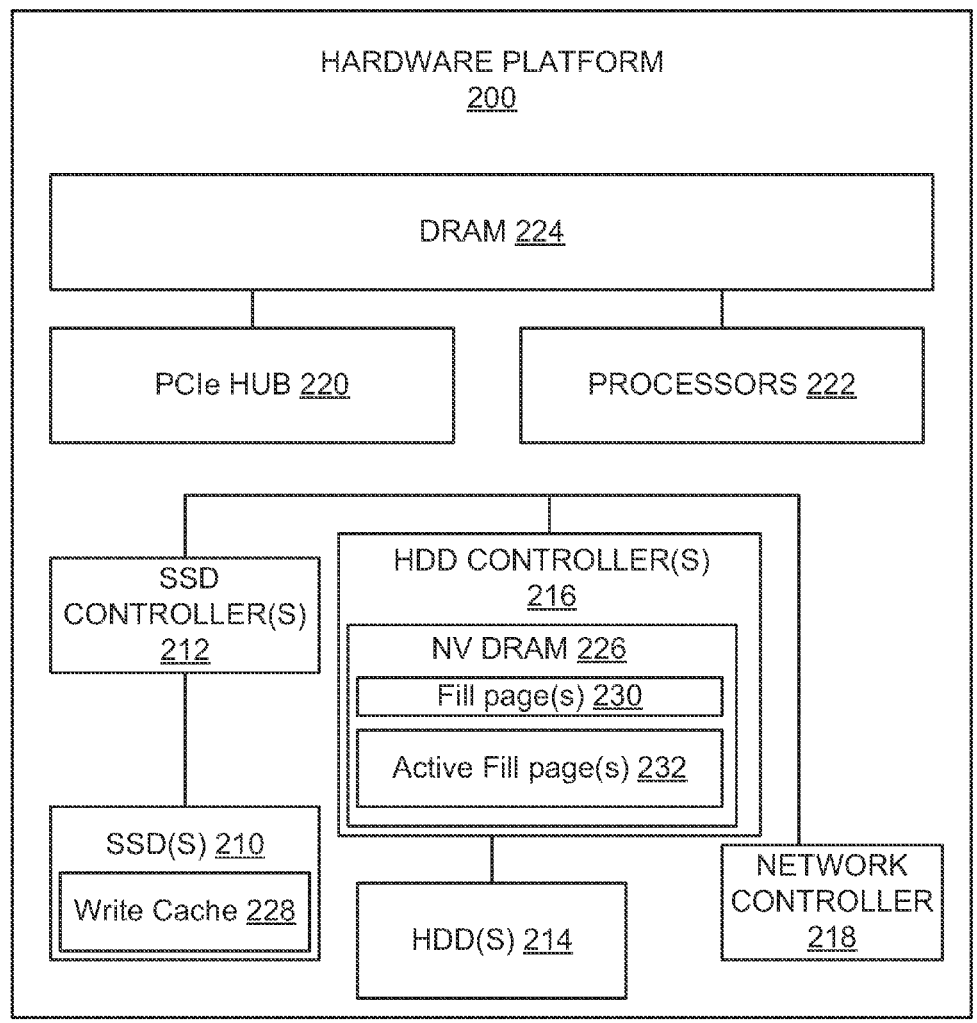
FIG. 2 is a block diagram of an illustrative hardware platform of an object store in accordance with some embodiments.

FIG. 2 is a block diagram of an illustrative hardware platform 200 of an object store in accordance with some embodiments. The particular hardware components shown in FIG. 2 are not meant to depict all the hardware components which may be comprised in hardware platform 200 nor are they meant to depict necessary or required components of hardware platform 200, as the hardware components shown in FIG. 2 are optional and are merely illustrative of an embodiment.

Hardware platform 200 includes one or more solid state devices (SSDs) 210 and one or more parallel SSD controller(s) 212. As broadly used herein, SSD(s) 210 may be implemented using any type of solid state device, although examples discussed herein shall be explained in the context of SSD(s) 210 being implemented using flash memory and SSD controller 212 being a flash memory controller. Each SSD in SSD(s) 210 contains a write cache 228. In an embodiment, hardware platform 200 may include one or more hard-disk drives (HDDs) 214 and one or more HDD controller(s) 216. In an embodiment, each HDD controller in HDD controller(s) 216 may include a NV DRAM 226. In an embodiment, NV DRAM 226 may store one or more of fill pages 230 and one or more active fill pages 232 (both described in more detail below) for SSD 210.

NV DRAM 226 may be constructed using a DRAM which includes a battery so that if the power to the DRAM is disrupted, the battery will supply power to the DRAM, thereby ensuring that the data stored thereon may be persistently stored (at least until the battery runs out). Hardware platform 200 also includes network controller 218, PCIe HUB 220, one or more processors 222, and dynamic random access memory (DRAM) 224.

Figure 3:
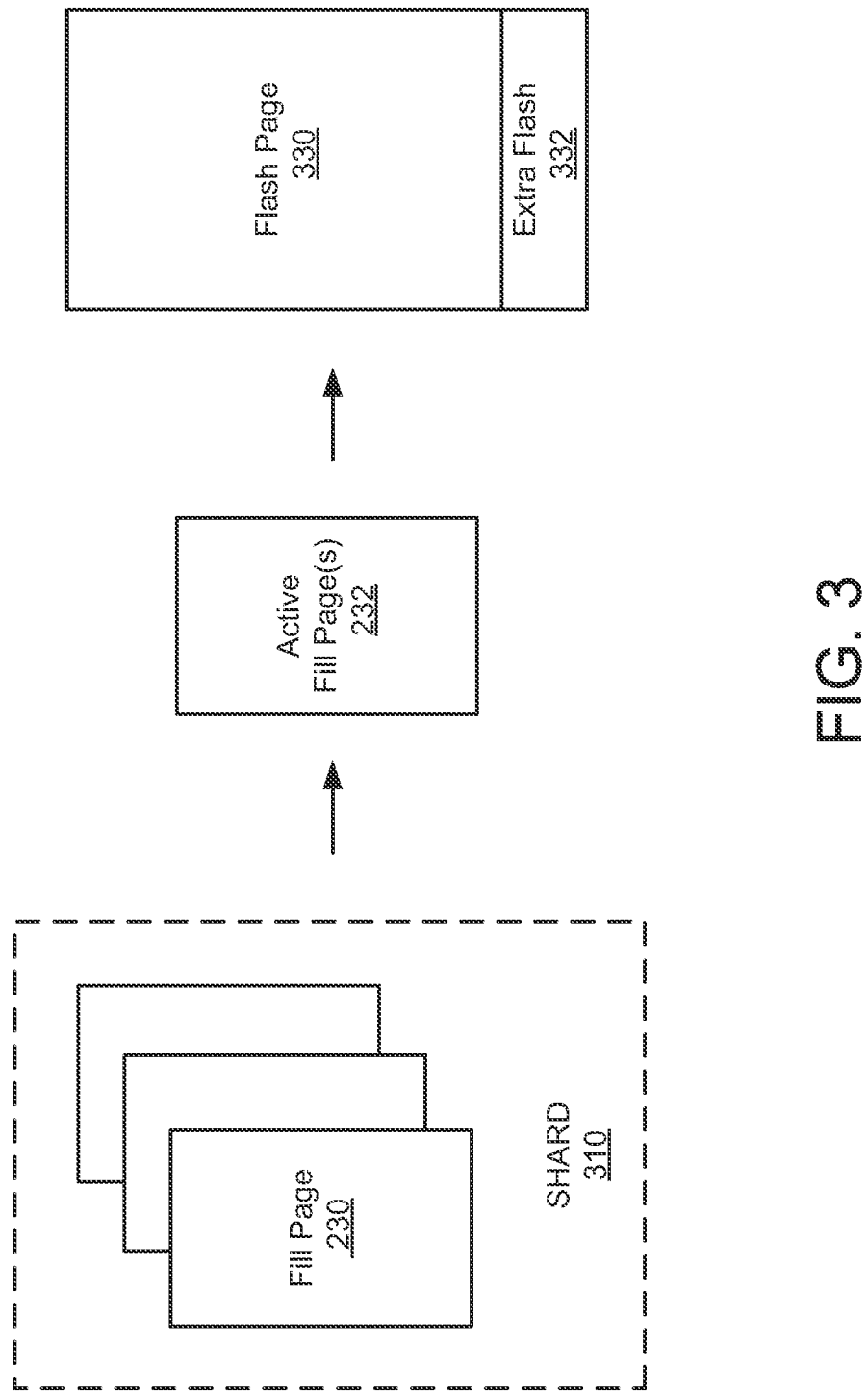
FIG. 3 depicts a flash write operation storing data objects in flash memory in accordance with some embodiments.

FIG. 3 depicts a flash write operation storing data objects in flash memory in accordance with some embodiments. Data objects (e.g., data objects 152 of FIG. 1) are packed into pages (e.g., an entire erased block) before being committed to flash memory, such as flash memory 210 of FIG. 2. Each shard 310 maintains a set of fill-pages 230 of NV DRAM 226 of FIG. 2. Each fill-page 230 represents a page (possibly a partial page) that has not been committed and is pre-associated with a physical page of flash memory 210. This helps flash controller 212 of FIG. 2 to know where to commit fill-page 230 in the event of a power failure. Fill-pages 230 are ordered as are the data objects on fill pages 230. Active fill pages 232 represent those pages that have not been committed to flash memory 210 yet—either because flash memory 210 is busy or because the page is not completely full. Only a single page is actively being filled by a single shard 310 at any point in time (except for coalescing operations which use their own fill-pages in NV DRAM 226).

As a data object write operation occurs, data object 152 is written to the next unused sequential location in the fill-page 230. If data object 152 in the fill-page 230 is rewritten before the page is committed to flash memory 210, then it is generally written a second time since doing otherwise poses a risk to the previous copy if the system crashes during the write operation. The data object location is then updated in the object table 140 of FIG. 1. Once fill-page 230 is full, the commit of fill-page 230 to flash memory 210 is started as soon as possible. A new page from NV DRAM 226 is taken from the free list to replace the fill-page 230, which is being committed, as the current fill-page and is associated with a new flash page 330 based on the well known wear-leveling information. Once the commit is completed, the committed NV DRAM page is placed on the free list. Each page of flash memory 210 (e.g., flash page 330) has a small amount of extra flash memory 332, which is typically 128 bytes per page. Extra flash memory 332 is used by flash memory controller 212 to record: (1) the current wear counter for the page, (2) the timestamp of the write, (3) the identity of the owning shard 310 and (4) the flash location associated with the new page that replaces this page as the current fill-page (which forms a forward-chain for recovery). Data objects are written to flash memory 210 as key/data pairs together with the key length and data length. Zero-length data objects are allowed and a special value is written as the data length for data objects is deleted in a delete operation. This is useful for recovery purposes (alternatively one could keep a log of erased data objects).

Figure 4:
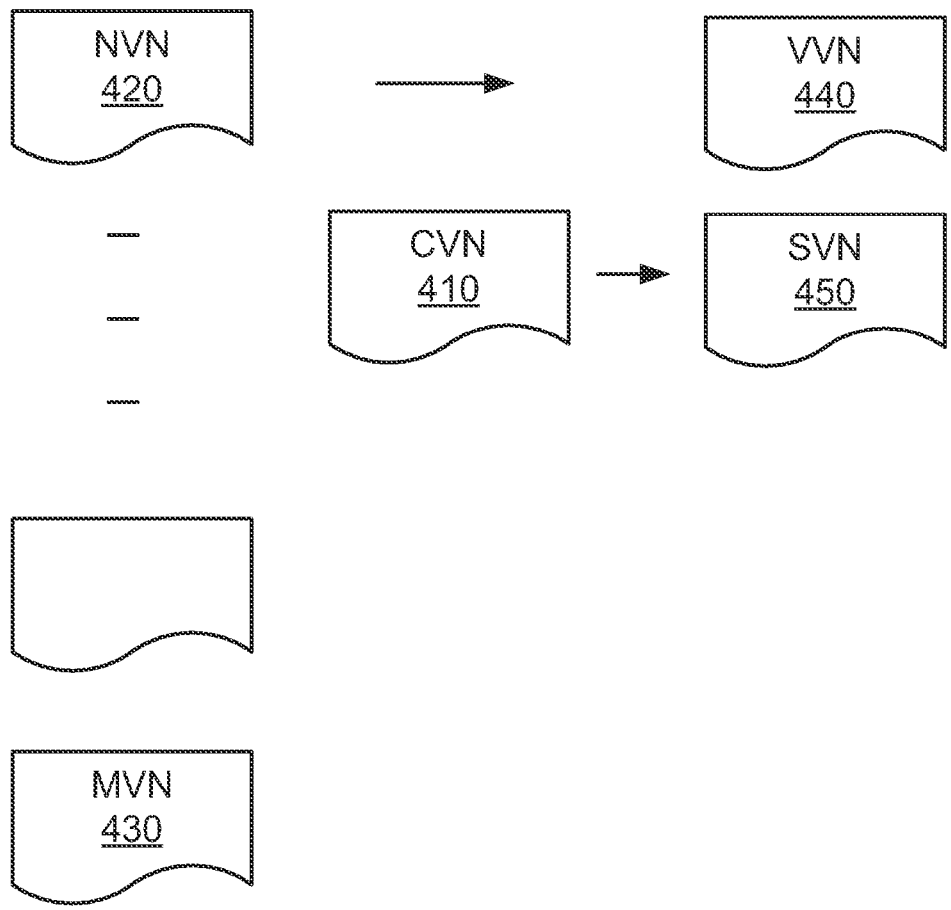
FIG. 4 depicts association of various version numbers to data objects in accordance with some embodiments.

FIG. 4 depicts association of various version numbers to data objects in accordance with some embodiments. Each time a data object (e.g., data object 152 of FIG. 1) is written to flash memory 210 of FIG. 2, a version number (e.g., version number 144 of FIG. 1) is associated with that update of the data object. The version number is also contained in object table 140 of FIG. 1. It is possible for a single data object 152 to have multiple versions in the object table 140 at the same time. For example, a series of updates to a given data object can have monotonically increasing version numbers. Further, as each data object is written to flash and the object table 140, it is also added to object linked-list 130 of FIG. 1.

Flash memory controller 212 of FIG. 2 is configured to associate version numbers with data objects 152 in storage blocks. Flash memory controller 212 is also configured to maintain a list of all data objects associated with a particular version number. Zero or more data objects may be associated with a particular version number. A particular data object 152 may at any time have one or more version numbers associated with it. In an embodiment, the version number associated with a data object is determined by the application issuing the put operation. By default, the current-version-number (CVN) 410 associated with the container is assigned to a data object when it is written but an application can use explicit version numbers as well. Additional version numbers such as a next-version-number (NVN) 420 and a minimum active version number (MVN) 430 are also unique to each container. NVN 420 is always greater than CVN 410 and MVM 430 is always less than or equal to CVN 410. All three version numbers increase monotonically.

Further, there is a per-shard linked-list of all objects with the same version number with a head for each version number between the MVN 430 and CVN 410 inclusive. Similarly, the version number used in a get operation is determined by the application making the request with the default being the CVN 410. When the object table 140 and the associated object linked-list 130 of FIG. 1 is scanned, a match only occurs if all three of the following conditions are met: (1) Object key 110 matches (directly or via the syndrome/key algorithm described above; (2) Object version number 144 of FIG. 1 in object table 140 is less than or equal to the version number specified in the get request; and (3) Object version number 144 in object table 140 is not in a dead-version list. The dead-version list includes a list of version numbers which are no longer valid.

Still referring to FIG. 4, in some embodiments, applications use version number 144 in put/get calls to achieve versioning or snapshotting. For example, on a snapshot request by a snapshot application, flash memory controller 212 of FIG. 2 increments CVN 410. If the CVN 410==NVN 420, then NVN 420 is also incremented. Next, the original (un-incremented) CVN 410 is returned to the snapshot application as a snapshot version number (SVN) 450. Other (non-snapshotted) applications will use CVN 410 for all put operations. (Snapshotted versions may not perform put operations.) When a data object is written, it is tagged with CVN 410. If a SVN is active (known from the container metadata), then older versions of data object are not released when a new version is written. The new entry in object table 140 is added to the per-shard linked-list of objects with the same version number.

In an embodiment, the snapshot application uses SVN 450 when performing get operations. Since looking up object table 140 is conditioned on the version number 144, a snapshotted lookup of a data object will not see any data object written after the snapshot is taken. When the application is finished with the snapshot, it performs a call to a sharing data fabric (SDF) to terminate the snapshot. SDF garbage collector then walks the per-shard linked-list for each version number between the MVN 430 and the CVN 410 (or between the MVN 430 and the version number of the oldest active snapshot) and releases the duplicate objects with lower version numbers. Finally, the MVN 430 is updated. SDF is a middle-ware layer that includes interface for communications between high-level programs and lower-level hardware controllers and their software and firmware programs. SDF is accessible by high-level application programs using an application programming interface (API). Communication between various nodes that may have stored various versions of a data object is performed by SDF threads. Below, versioning with commit is discussed.

In some embodiments, on a version request, SDF increments NVN 420 and returns the original (un-incremented) NVN 420 to the application as a versioned-version-number (VVN) 440. Other (non-snapshotted) applications will use CVN 410 for all put/get operations. When a data object is written by the versioned application, the new entry in object table 140 is added to the per-shard linked-list of data objects with the same version number (as always). Data object 152 is also marked as uncommitted. Any non-versioned application uses CVN 410 when performing get operations. Since the object table lookup is conditioned on the version number, a non-versioned application lookup of a data object will not see any data object written by the versioned application. If a copy of data object 152 is written by a non-versioned application then the versioned application will see that copy when it performs a get operation. If both the versioned and the non-versioned application write data object 152, then the non-versioned copy will be lost on commit. Locks must be used if this is not the desired behavior.

In an embodiment, when the application commits CVN 410, it will be updated to the VVN 440. A special commit record will be written to flash with the just-committed version number. This is used during reboot to re-mark the flash objects previously labeled as uncommitted. The SDF garbage collector eventually cleans up any duplicate copies of data objects with version numbers between the old CVN 410 and the VVN 440. Once this is complete the special commit record can also be removed by the garbage collector. The techniques herein also support versioning when an abort occurs as discussed below.

With continued reference to FIG. 4, in an embodiment, on versioning with abort everything proceeds as above until the point of commit. At that point an abort situation is assumed. In this situation, CVN 410 remains unchanged as does the NVN 420. VVN 440 is added to the list of dead versions, and a special "abort" record is written to flash memory 210 with the aborted version number (i.e., CVN 410). The record will be used on reboot to discard any remaining data objects with that version number. The SDF garbage collector walks the VVN 440 object chain releasing VVN 440 data objects. These dead data object versions are also in flash memory 210 and must be erased so that the flash pages 330 of FIG. 3 associated with the dead objects are scheduled for immediate coalescing. The SDF garbage collector eventually rewrites the flash pages 330 with the dead objects omitting the dead objects themselves. This is a background task. Once it is complete the dead version can be removed from the dead version table and the special "abort" record can be deleted from flash by the garbage collector. Note that the garbage collection can be slow, therefore, data consistency does not depend on its completion.

Versioning collisions may occur when multiple transactions each create a version of the same container and then attempt to use data objects in conflicting ways. Note that there are never collisions between versions and snapshots since the snapshots are read-only by definition. There are several types of collisions such as write-write collisions (when both versions attempt to write the same data object); write-read collisions (when one version writes a data object which the other version attempts to read); and finally, read-write collisions (when a data object is read by one version and later written by the other version). The initial version of SDF will not attempt to detect collisions. Collision avoidance (if desired) is the responsibility of the application. Another embodiment discussed below addresses split versioning, which occurs when a single thread uses different version numbers to achieve different consistency levels.

Read-uncommitted, read-committed, and read-reproducible isolation operations, well-known in the art of database management, are supported directly by the SDF fabric. The version number used by an application for get operations need not be the same as the version number used by put operations. Applications may also use explicit version numbers either for gets or puts. However, the version must be either explicitly locked or released by the application. It is expected that most applications will use a SDF supplied library routine which specifies a database consistency level. The library routine will then be responsible for managing the explicit version numbers. Read-committed operations always use the version number of the most-recently committed version (which can change during a transaction). Read-uncommitted operations always use the highest-numbered, non-aborted version number. Normal (non-versioned) SDF get operations are treated as read-committed. Read-reproducible operations are somewhat different in that the application (or library routine) must "lock" the reproducible version with an application programming interface (API) call. This returns the version number of the most recently committed version and remains static for the duration of the transaction. The application (or library routine) must release the version when the transaction completes. Example API and library routines used in some embodiments are shown below.

Transaction API
    SDFVersion_t version Container::startTransaction (transType_t transType); Container:endTransaction (SDFVersion_t version); Container: :commitTransaction (SDFVersion_t version); Container: :abortTransaction (SDFVersion_t version);
    Trans types: read-reproducible (required end transaction) write (requires commit or abort transaction) snapshot (requires end transaction)

Figure 5:
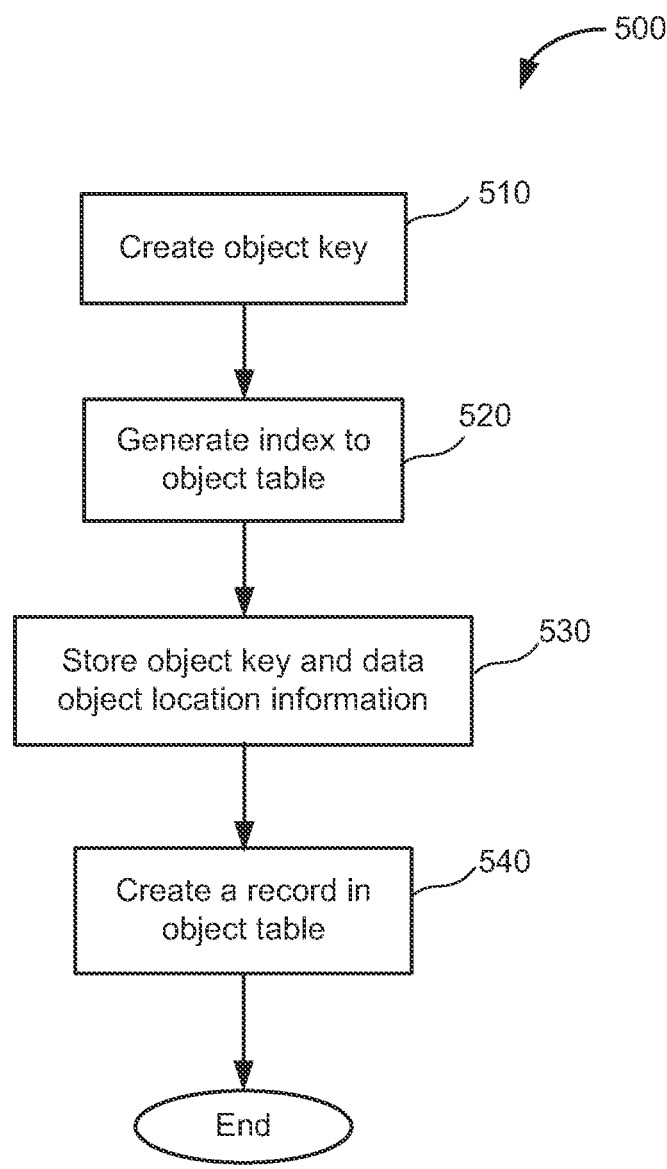
FIG. 5 is a flow diagram of a method for data versioning in a non-volatile memory in accordance with some embodiments.

Get/Put API
    string_t data Container: getObject(string_t key, SDFVersion_t version);
    Container:putObject(string_t key, string_t data, SDFVersion_t version);
    If version is null, then the top-committed version number is used (normal get/put).
Log API
    log Jd_t Container: :put(string_t data)
    Container: delete(log id_t_log_id)
    Delete removes all log messages up to and including the specified log Jd from the container.
Library routines:
    string_t data Container:readReproducible(string_t_key, SDFVersion_t version); string_t data Container:: readUncommitted(string t key); string_t data Container: :readCommitted(string_t key);

FIG. 5 is a flow diagram of a method 500 for data versioning in a non-volatile memory in accordance with some embodiments. Method 500 includes creating object key 110 associated with data object 152, which uniquely identifies data object 152 and is stored in non-volatile memory 150, all of FIG. 1 (510). An index to object table 140 of FIG. 1 (i.e., object table index 120 of FIG. 1) is generated by using object key 110. First, object key 110 is hashed, using well-know algorithms, to produce a syndrome (e.g., a 32 bit syndrome). Then, a portion of the syndrome is masked to produce object table index 120 (520). Version number 144 of FIG. 1 is stored in conjunction with data object 152 in the non-volatile memory 150. In object linked-list 130, object key 110 and location information 132 of data object 152 in non-volatile memory 150 are stored (530). A record associated with the data object 152 is created in object table 140. The record includes an index 120, reference 142 to the object linked-list, and version number 144 (540).

Figure 6:
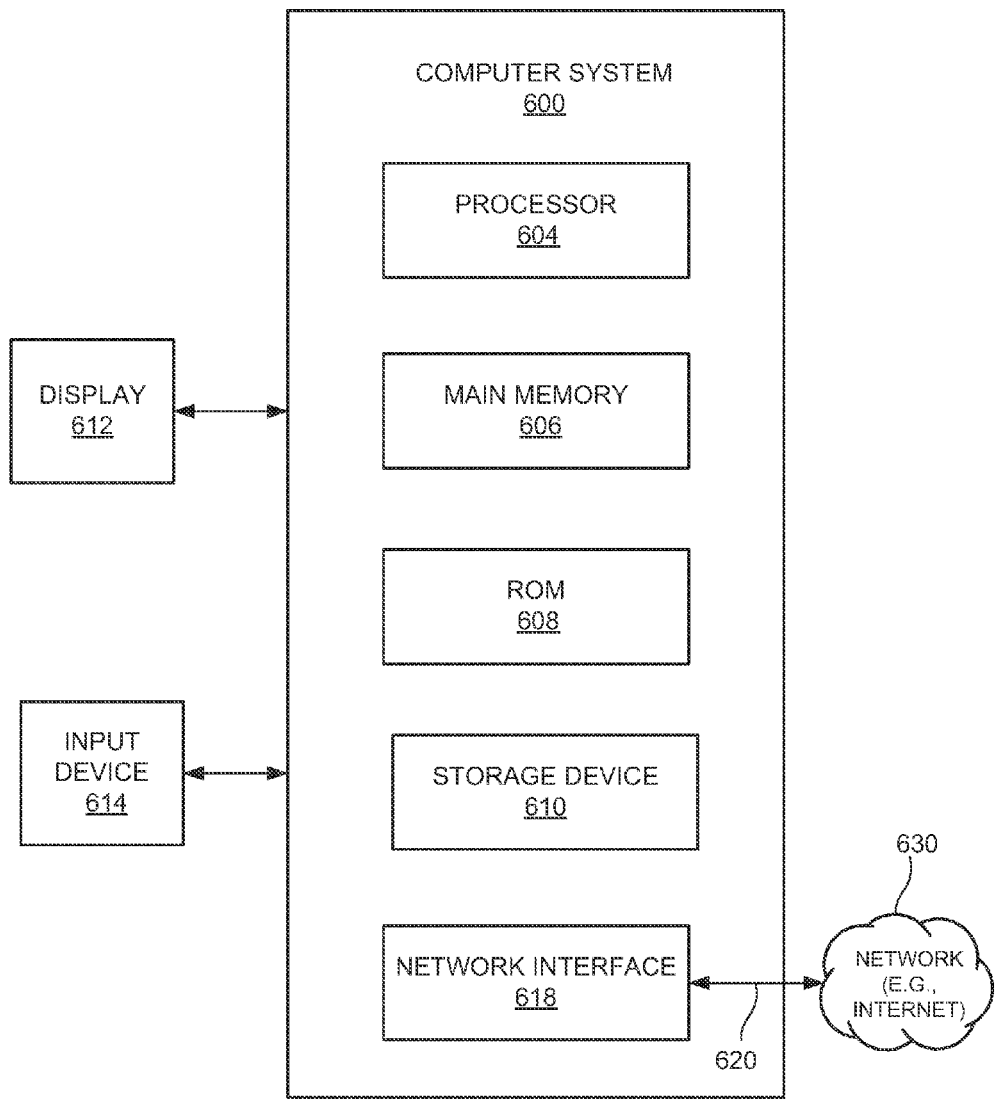
FIG. 6 is a block diagram illustrating a computer system upon which an embodiment of the invention may be implemented.

FIG. 6 is a block diagram illustrating a computer system 600 upon which an embodiment of the invention may be implemented. Computer system 600 includes processor 604, main memory 606, ROM 608, storage device 610, and communication interface 618. Processor 604 may include more than one processor. Main memory 606 may include a random access memory (RAM) or other dynamic storage device for storing information and instructions to be executed by processor 604. Main memory 606 also may be used for storing temporary variables or other intermediate information during execution of instructions to be executed by processor 604. Computer system 600 further includes a read-only-memory (ROM) 608 or other static storage device for storing static information and instructions for processor 604. A storage device 610, such as a magnetic disk or optical disk, is provided for storing information and instructions.

Computer system 600 may be coupled to a display 612, such as a cathode ray tube (CRT), a LCD monitor, and a television set, for displaying information to a user. An input device 614, including alphanumeric and other keys, is coupled to computer system 600 for communicating information and command selections to processor 604. Other non-limiting, illustrative examples of input device 614 include a mouse, a trackball, or cursor direction keys for communicating direction information and command selections to processor 604 and for controlling cursor movement on display 612. While only one input device 614 is depicted in FIG. 6, embodiments of the invention may include any number of input devices 614 coupled to computer system 600.

Present embodiments are related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative embodiments, hard-wired circuitry may be used in place of, or in combination with, software instructions to implement embodiments of the invention. Thus, embodiments of the invention are not limited to any specific combination of hardware circuitry and software.

The term "machine-readable storage medium" as used herein refers to any medium that participates in storing instructions which may be provided to processor 604 for execution. Such a medium may take many forms, including but not limited to, non-volatile media and volatile media. Non-volatile media includes, for example, optical or magnetic disks, such as storage device 610. Volatile media includes dynamic memory, such as main memory 606.

Non-limiting, illustrative examples of machine-readable media include, for example, a floppy disk, a flexible disk, hard disk, magnetic tape, or any other magnetic medium, a CD-ROM, or any other optical medium, a RAM, a PROM, and EPROM, a FLASH-EPROM, or any other memory chip or cartridge, or any other medium from which a computer can read.

Various forms of machine readable media may be involved in carrying one or more sequences of one or more instructions to processor 604 for execution. For example, the instructions may initially be carried on a magnetic disk of a remote computer. The remote computer can load the instructions into its dynamic memory and send the instructions over a network link 620 to computer system 600.

Communication interface 618 provides a two-way data communication coupling to a network link 620 that is connected to network 630. For example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information. Network link 620 typically provides data communication through one or more networks to other data devices. For example, network link 620 may provide a connection through a local network to a host computer or to data equipment operated by an Internet Service Provider (ISP).

Computer system 600 can send messages and receive data, including program code, through the network(s), network link 620 and communication interface 618. For example, a server might transmit a requested code for an application program through the Internet, a local ISP, a local network, and subsequently to communication interface 618. The received code may be executed by processor 604 as it is received, and/or stored in storage device 610, or other nonvolatile storage for later execution.

One or more embodiments described herein provide that methods, techniques, and actions performed by a computing device are performed programmatically, or as a computer-implemented method. Programmatically means through the use of code or computer-executable instructions. A programmatically performed step may or may not be automatic.

One or more embodiments described herein may be implemented using programmatic modules or components. A programmatic module or component may include a program, a subroutine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

While the present embodiments have been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

What is claimed is:

1. A method for retrieving versioned data in a non-volatile memory, the method comprising:
   receiving a read request for a data object; and
   in response to the request:
      determining, via an object table, whether two or more versions of the data object exist in memory;
      in accordance with a determination that two or more versions exist in memory, obtaining, via the object table, a respective location where a particular version of the two or more versions of the data object is stored; and
      reading at least the particular version of the two or more versions of the data object from the respective location into volatile memory;
   wherein the object table comprises multiple records and each record includes a reference to an object list, a version number distinct from the reference to the object list, and an object index.

2. The method of claim 1, further comprising, in accordance with the determination that two or more versions exist in memory, obtaining, via the object table, a respective storage location for each of the two or more versions of the data object.

3. The method of claim 1, wherein the object index is generated based on a hash of an object key that uniquely identifies the data object.

4. The method of claim 1, wherein the object list includes an object key that uniquely identifies the data object and location information corresponding to the data object.

5. The method of claim 1, wherein the object table includes two or more records corresponding to the data object, wherein each record of the two or more records includes a distinct version number.

6. The method of claim 1, wherein the read request includes a specified version number for the data object; and
   wherein determining, via the object table, whether two or more versions of the data object exist in the memory comprises determining whether two or more versions of the data object, each with corresponding version number less than or equal to the specified version number, exist in the memory.

7. The method of claim 1, wherein determining, via the object table, whether two or more versions of the data object exist in the memory includes determining whether each of the two or more versions is listed on a dead-version list.

8. The method of claim 1, further comprising:
   determining a current version number for the data object; and
   in accordance with the determination that two or more versions exist in memory, determining whether one of the two or more versions is the current version;
   wherein reading at least the particular version of the two or more versions of the data object from the respective location into the volatile memory comprises reading the current version of the data object into the volatile memory.

9. The method of claim 1, further comprising:
   receiving a snapshot request; and
   in response to a snapshot request, incrementing a current version number for the data object, wherein the incremented current version number is used by applications concurrently using the data object.

10. A system for retrieving versioned data, the system comprising:
    non-volatile memory configured to store one or more data objects; and
    one or more non-volatile memory controllers configured to:
       receive a read request for a data object;
       in response to the request:
          determine, via an object table, whether two or more versions of the data object exist in the non-volatile memory;
          in accordance with a determination that two or more versions exist in the non-volatile memory, obtain, via the object table, a respective location where a particular version of the two or more versions of the data object is stored; and
          read at least the particular version of the two or more versions of the data object from the respective location into volatile memory;
       wherein the object table comprises multiple records and each record includes a reference to an object list, a version number distinct from the reference to the object list, and an object index.

11. The system of claim 10, wherein the one or more non-volatile memory controllers are further configured to obtain, in accordance with the determination that two or more versions exist in memory, a respective storage location for each of the two or more versions of the data object, via the object table.

12. The system of claim 10, wherein the object index is generated based on a hash of an object key that uniquely identifies the data object.

13. The system of claim 10, wherein the object list includes an object key that uniquely identifies the data object and location information corresponding to the data object.

14. The system of claim 10, wherein the object table includes two or more records corresponding to the data object, wherein each record of the two or more records includes a distinct version number.

15. The system of claim 10, wherein the read request includes a specified version number for the data object; and
    wherein determining, via the object table, whether two or more versions of the data object exist in the non-volatile memory comprises determining whether two or more versions of the data object, each with corresponding version number less than or equal to the specified version number, exist in the non-volatile memory.

16. The system of claim 10, wherein determining, via the object table, whether two or more versions of the data object exist in the non-volatile memory includes determining whether each of the two or more versions is listed on a dead-version list.

17. The system of claim 10, wherein the one or more non-volatile memory controllers are further configured to:
- determine a current version number for the data object; and
- in accordance with the determination that two or more versions exist in memory, determine whether one of the two or more versions is the current version;
- wherein reading at least the particular version of the two or more versions of the data object from the respective location into the volatile memory comprises reading the current version of the data object into the volatile memory.

18. The system of claim 10, wherein the one or more non-volatile memory controllers are further configured to:
- receive a snapshot request; and
- in response to a snapshot request, increment a current version number for the data object, wherein the incremented current version number is used by applications concurrently using the data object.

* * * * *